United States Patent [19]
Tanaka

[11] Patent Number: 4,507,771
[45] Date of Patent: Mar. 26, 1985

[54] MOTOR DRIVE APPARATUS

[75] Inventor: Toshio Tanaka, Gunma, Japan

[73] Assignee: Tokyo Shibaura Denki Kabushiki Kaisha, Kawasaki, Japan

[21] Appl. No.: 496,567

[22] Filed: May 20, 1983

[30] Foreign Application Priority Data

May 27, 1982 [JP] Japan ................................. 57-90071

[51] Int. Cl.³ .......................... G11B 3/36; G11B 17/04
[52] U.S. Cl. .................................. 369/77.2; 369/215; 369/219; 369/221
[58] Field of Search ...................... 369/77.2, 219, 221, 369/215

[56] References Cited
U.S. PATENT DOCUMENTS

| 3,827,697 | 8/1974 | Miyoshi | 369/184 |
| 4,083,565 | 4/1978 | Iyeta | 369/220 |
| 4,426,695 | 1/1984 | Moriki et al. | 369/219 |

Primary Examiner—Steven L. Stephan
Attorney, Agent, or Firm—Cushman, Darby and Cushman

[57] ABSTRACT

A motor drive apparatus for a disc player which includes a pickup, a pickup shift mechanism for shifting a position of the pickup and an automatic loading mechanism for loading a jacketed disc into the disc player. The motor drive apparatus comprises a motor for actuating the pickup shift mechanism and automatic loading mechanism, a servo controller for servo-controlling the rotation of the motor according to the position of the pickup so that a tracking servo control for the pickup is effected by the pickup shift mechanism, a position sensor for sensing the position of a jacket of the jacketed disc, an actuation controller for controlling the rotation of the motor according to the position of the jacket so that automatic loading of the jacketed disc is performed, and a mode instructor for selectively connecting one of the servo controller and actuation controller to the motor. Only the tracking servo control is effected when the mode instructor connects the servo controller to the motor, and only the automatic loading of the jacketed disc is effected when the mode instructor connects the actuation controller to the motor.

5 Claims, 22 Drawing Figures

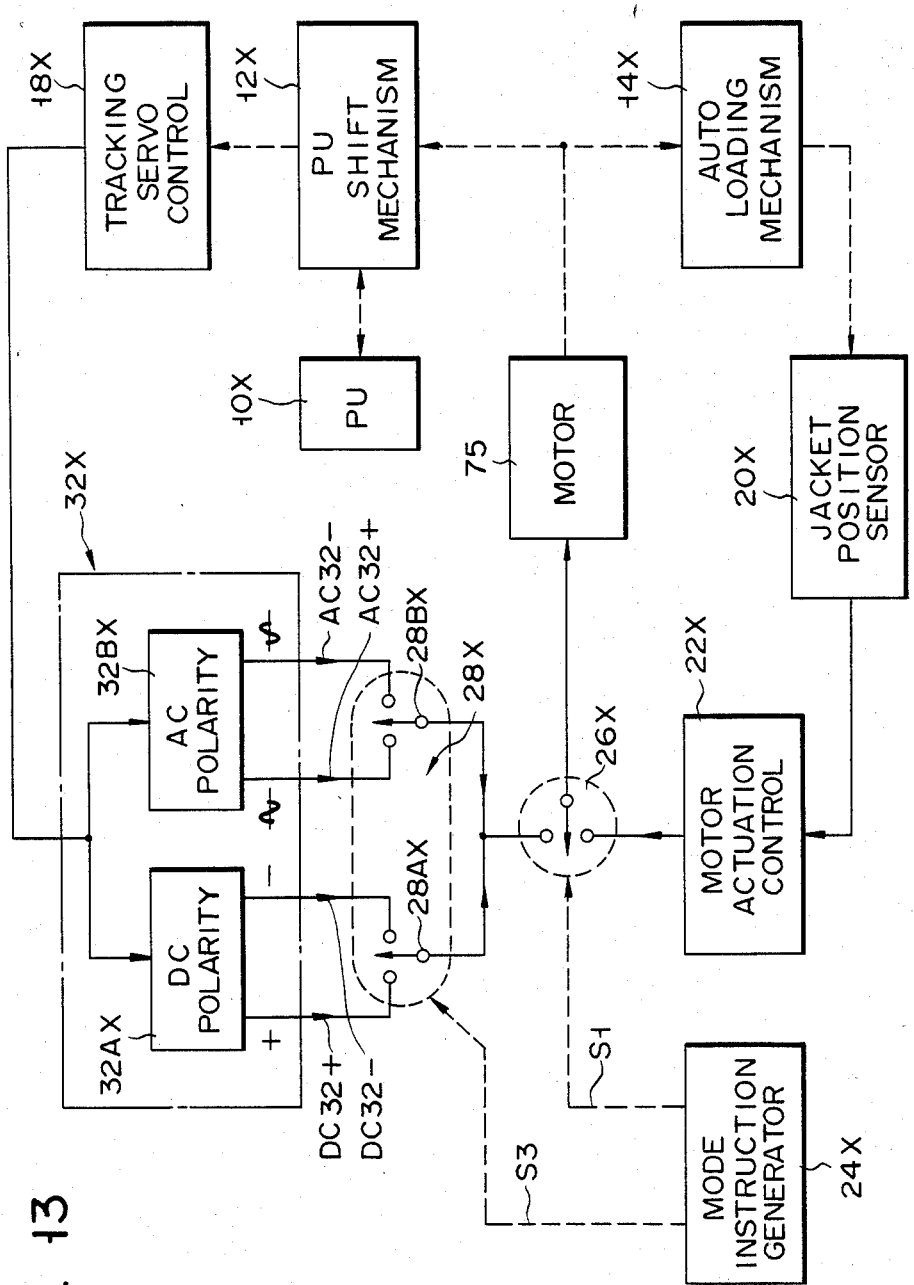
F I G. 13

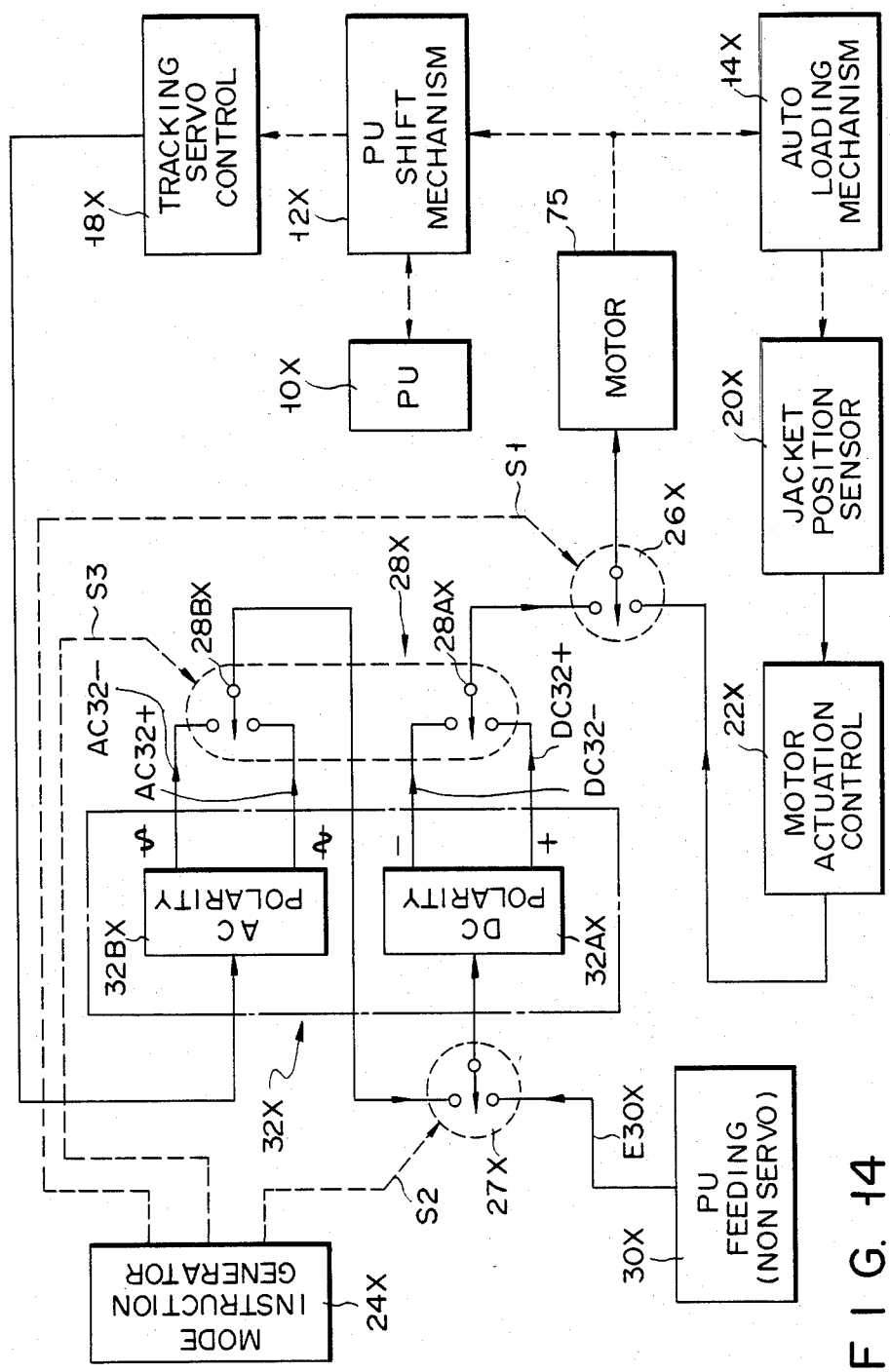
F I G. 14

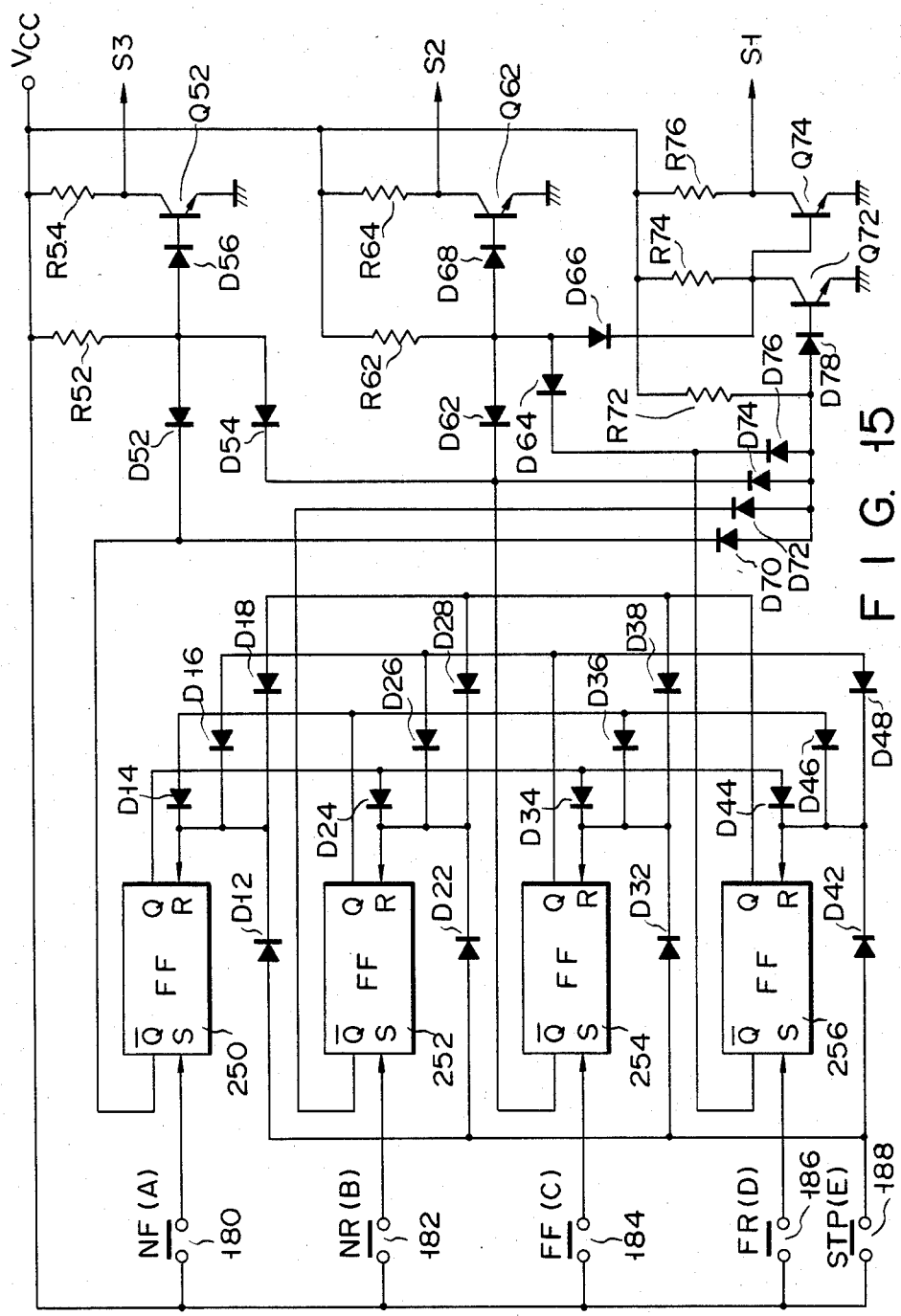
F I G. 15

MOTOR DRIVE APPARATUS

BACKGROUND OF THE INVENTION

The present invention relates to a motor drive apparatus for a disc reproducing apparatus, such as a video disc player, having an arm feed device for feeding a pickup arm and an automatic loading device for automatically inserting a jacket with the video disc into a player body or for pulling the jacket from the player body, in which the motor drive apparatus serves as a drive source for both the arm feed device and the automatic loading device.

Developments have recently been made in a reproducing apparatus using a video disc or a PCM recorded disc. In a video disc or a PCM disc, signals are recorded in the form of small pits by means of a digital recording system. However, in a video disc or a PCM disc of this type, deposition of dust or dirt from a user's hand results in signal dropout, thus significantly degrading the quality of the reproduced signals. Furthermore, since the signals are digitally recorded, a pickup element for picking up the recorded signals must be very accurate. However, this means that the pickup element is more subject to damage due to dust or dirt from a user's hand.

In view of this problem, a reproducing apparatus for a video disc (hereinafter referred to as a video disc player) is proposed wherein a video disc can be loaded and unloaded from the player body without requiring the user to touch or hold the video disc.

In a conventional video disc player, separate motors are required for driving the arm feed device and the automatic loading device. This requires separate driver circuits for the motors. However, the provision of separate motors and separate driver circuits increases both the manufacturing cost and the installation space, and therefore, the player body cannot be made compact in size.

SUMMARY OF THE INVENTION

It is accordingly the object of this invention to provide a motor drive apparatus in which a single motor serves both as a drive motor for driving an arm feed device (pickup shift mechanism) and as a drive motor for driving an automatic loading device.

In order to achieve the above and other objects of the present invention, there is provided a motor drive apparatus comprising means for, during a feed operation of a pickup arm, servo-controlling a drive voltage of a motor; and means for, during a loading/unloading operation of a jacket, controlling the polarity of said drive voltage upon detecting the position of the jacket in a player body.

In other words, a motor drive apparatus for a disc player according to the present invention includes a pickup, a pickup shift mechanism for shifting a position of the pickup, and an automatic loading mechanism for loading a jacketed disc into the disc player. The motor drive apparatus comprises a motor for actuating the pickup shift mechanism and automatic loading mechanism; a servo controller for servo-controlling the rotation of the motor according to the position of the pickup so that a tracking servo control for the pickup is effected; a position sensor for sensing the position of a jacket of the jacketed disc; an actuation controller for controlling the rotation of the motor according to the position of the jacket so that an automatic loading of the jacketed disc is performed; and a mode instructor for selectively connecting one of the servo controller and actuation controller to the motor.

The tracking servo control is effected when the mode instructor selects the servo controller, and the automatic loading of the jacketed disc is effected when the mode instructor selects the actuation controller.

According to the apparatus of the present invention, a single motor can serve both as a drive motor for the arm feed device or pickup shift mechanism and as a drive motor for the automatic loading device.

BRIEF DESCRIPTION OF THE DRAWINGS

FIG. 13 is a block diagram showing another modification of FIG. 11;

FIG. 14 is a block diagram showing still another modification of FIG. 11;

FIG. 15 is a circuit diagram of a mode instruction generator 24 shown in FIGS. 11 to 14;

DETAILED DESCRIPTION OF THE PREFERRED EMBODIMENTS

The preferred embodiment of the present invention will now be described with reference to the accompanying drawings.

Figure 1:
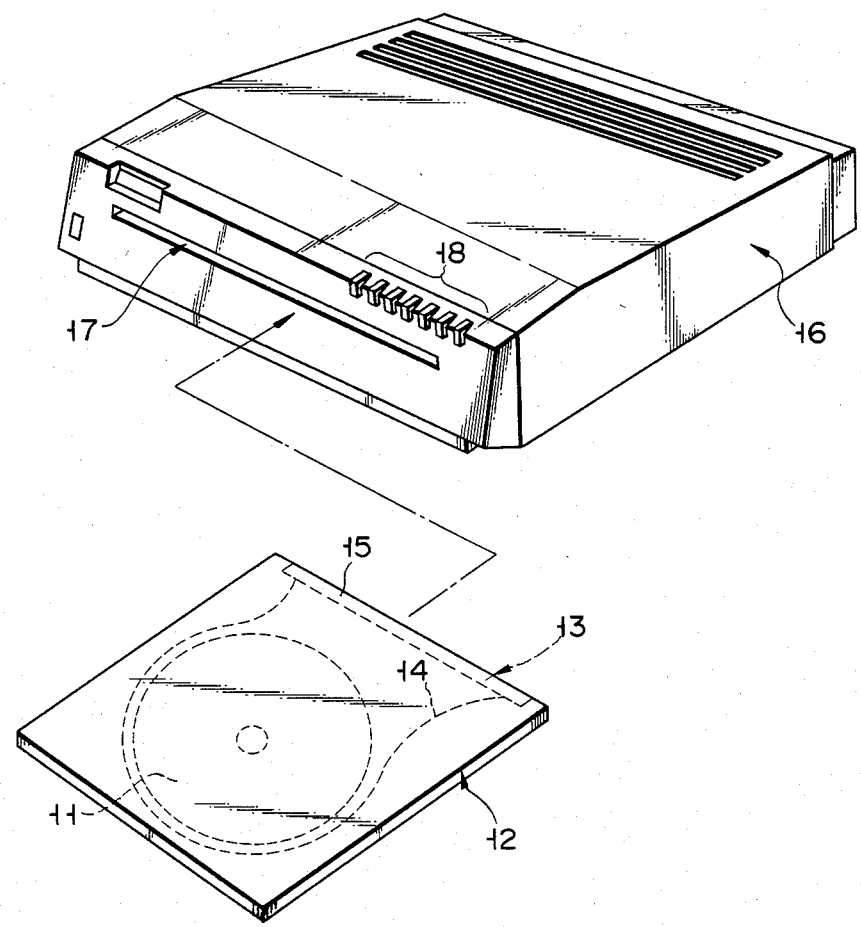
FIG. 1 is a perspective view showing the outer appearance of a video disc player.

A reproducing apparatus for a video disc (hereinafter referred to as a video disc player) allows loading of a video disc into or unloading it from a player body without requiring the user to touch the video disc. FIG. 1 schematically shows perspective view of a video disc player having such a configuration. Referring to FIG. 1, a video disc 11 is held inside a jacket 12. An opening 13 is formed along one side of jacket 12. Thus, disc 11 is enclosed in the jacket 12. Inside the jacket 12, disc 11 is held within a spine 14 having a ring shape. A cover 15 of spine 14 seals opening 13.

A jacket insertion port 17 for receiving jacket 12 therethrough is formed at one side of a player body 16. Various operation keys 18 for commanding the actuation of the player are arranged above the insertion port 17.

Figure 2:
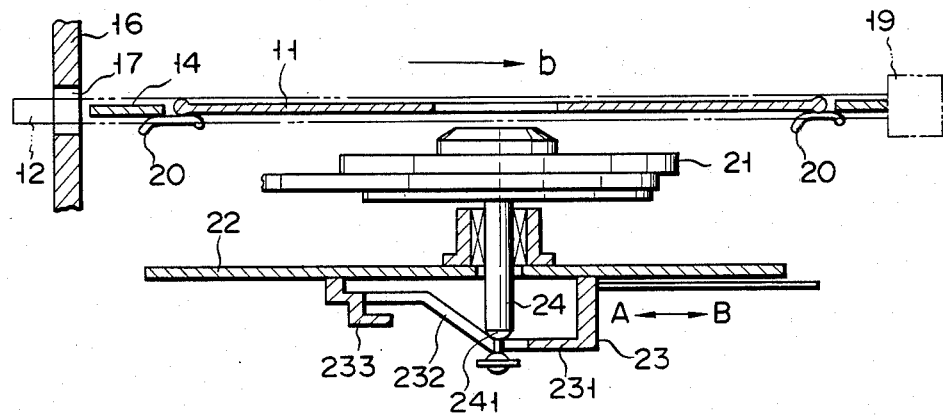
FIGS. 2 and 3 are side views for explaining the operation of the video disc player shown in FIG. 1.

FIG. 2 is a side sectional view showing the inside of player body 16. Disc 11 is held in jacket 12 and is inserted inside the body 16 through insertion port 17. Jacket 12 is inserted in the direction indicated by arrow b in FIG. 2. As jacket 12 is inserted inside the body 16, cover 15 is held by a chucking device 19 at the inner side of body 16. Then, jacket 12 is pulled away so as to leave the disc 11 and spine 14 inside the body 16. Disc 11 and spine 14 are held by supports 20 arranged inside the body 16.

Figure 3:
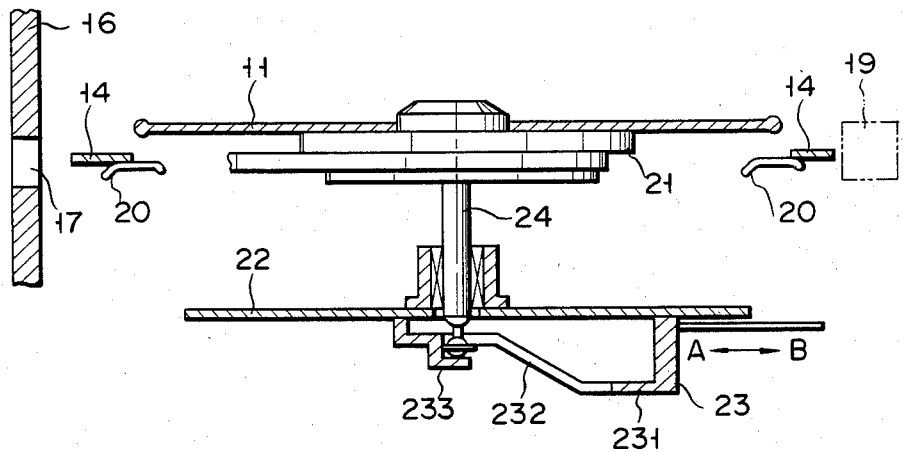

During the insertion operation of disc 11, a turntable 21 is positioned at its lower position, as seen in FIG. 2. With disc 11 being supported by supports 20, a slider 23 arranged on the lower surface of a chassis 22 is slid in the direction indicated by arrow B. Then, a lower end 241 of a rotating shaft 24 of turntable 21 moves from a lower portion 231 of slider 23 to an upper portion 233 thereof through an oblique portion 232 thereof, so that turntable 21 is lifted. As turntable 21 is lifted, disc 11 is located on turntable 21 to achieve a state shown in FIG. 3. In this state, turntable 21 rotates, and a pickup element (not shown) picks up recorded signals from disc 11. After the signals are reproduced, slider 23 slides in the direction indicated by arrow A. Then, turntable 21 is lowered to achieve a state shown in FIG. 2. As turntable 21 is lowered, disc 11 is supported by supports 20. Then, disc 11 may be unloaded from the player. For this purpose, an empty jacket 12 is inserted through insertion port 17 so as to hold the disc 11 and spine 14 in the jacket 12. When disc 11 and spine 14 are completely inserted in jacket 12, cover 15 is released from chucking device 19. When jacket 12 is pulled, disc 11 and spine 14 are held within jacket 12 and unloaded from player body 16. In the apparatus of the structure as described above, disc 11 may be loaded in player body 16 or may be unloaded therefrom without requiring the user to touch it. Therefore, no dust or dirt from a hand may be deposited on video disc 11.

In a video disc player of this type, a pickup element with a reproducing stylus is mounted on a pickup arm and is fed in the radial direction of disc 11. The video disc player therefore should have an arm feed device for feeding the pickup arm in the radial direction of disc 11 and an automatic loading device for loading jacket 12 in the player body 16 or unloading it therefrom.

Figure 4:
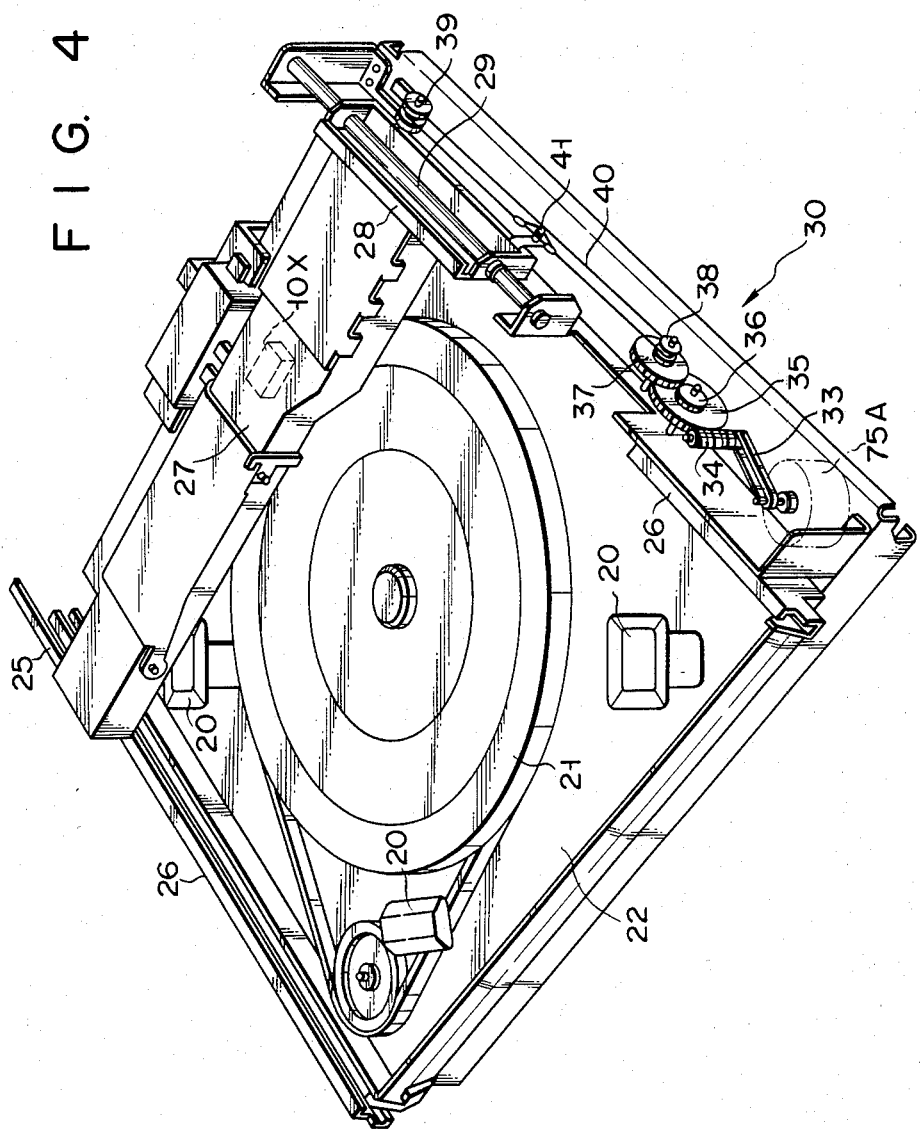
FIG. 4 is a perspective view showing an example of an arm feed device portion.

Examples of the arm feed device and the automatic loading device will now be described. An example of the arm feed device will be described with reference to FIG. 4. FIG. 4 schematically shows the interior of the player body 16. Referring to FIG. 4, reference numeral 25 denotes a subchassis and 26 denotes guide rails. Jacket 12 is inserted inside the body 16 or pulled therefrom while being guided along guide rails 26. A pickup 10X is mounted on a pickup arm 27. One end of pickup arm 27 is fixed to a carriage 28 which slides on a guide pole 29. Thus, pickup arm 27 is fed in the radial direction of disc 11 and so the reproducing stylus of pickup 10X is fed in the radial direction of disc 11. A feed mechanism 30 feeds the carriage 28. The mechanism 30 comprises a motor 75A, a worm gear 34 coupled to the rotating shaft of motor 75A through a belt 33, a first gear 35 meshing with worm gear 34, a second gear 36 of a small diameter which is coaxial with first gear 35, a third gear 37 meshing with second gear 36, a pair of pulleys 38 and 39, one of which is coaxial with third gear 37, and a wire 40 looped between pulleys 38 and 39. Part of wire 40 is locked by a pin 41 of carriage 28.

With such a construction, the rotational torque of motor 75A is transmitted to wire 40, and carriage 28 is moved along guide pole 29. Then, pickup arm 27 is moved in the radial direction of disc 11, and recorded signals are picked up from disc 11 through a reproducing stylus of pickup 10X.

Figure 5:
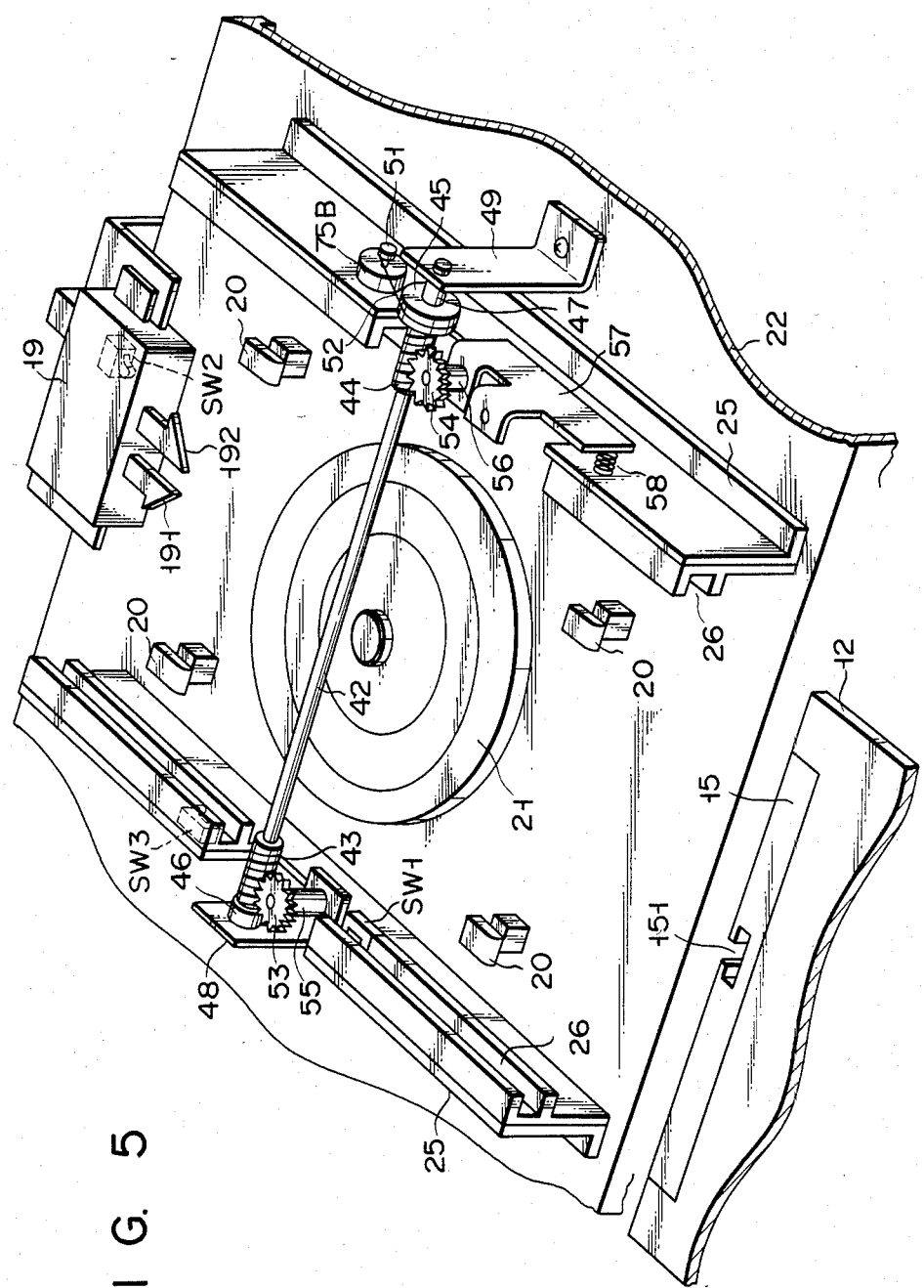
FIGS. 5 and 6 are a perspective view and a plan view, respectively, showing an example of an automatic loading device portion.

An example of the automatic loading device will now be described with reference to FIGS. 5 and 6. FIG. 5 is a perspective view schematically showing the interior of player body 16, and FIG. 6 is a plan view of the same in an operative mode.

Figure 6:
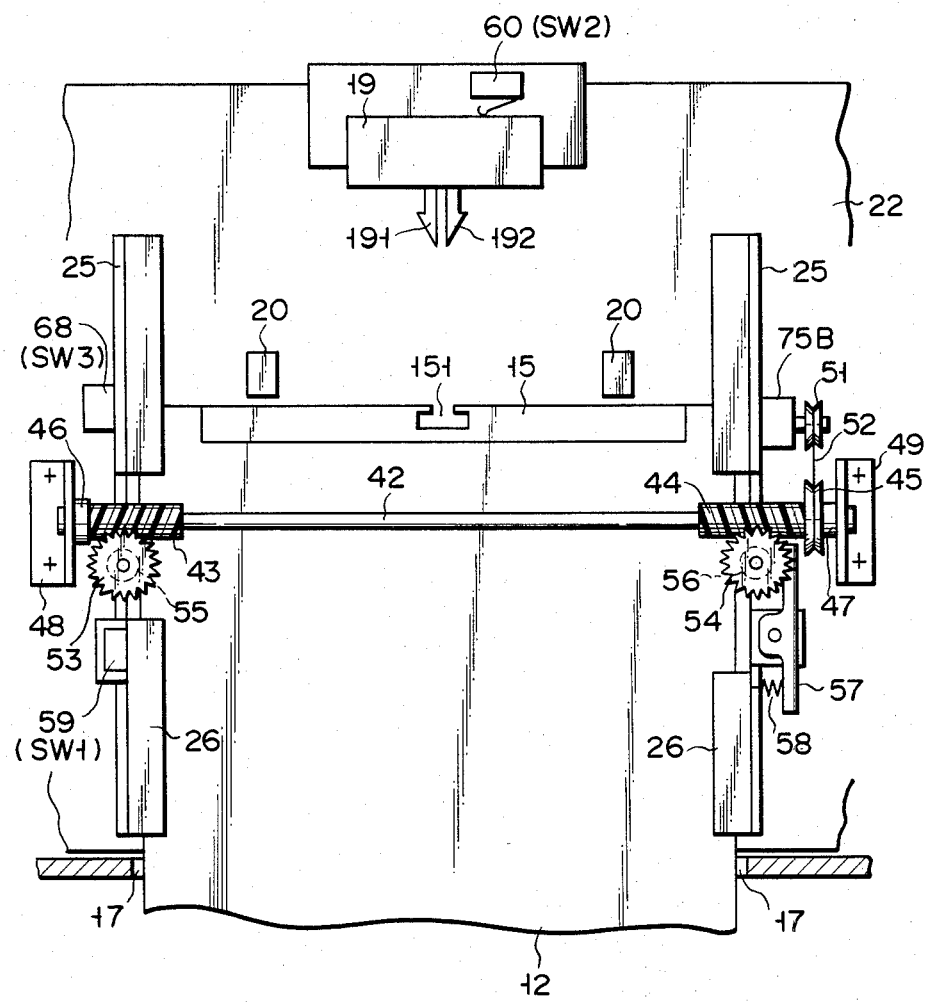

Referring to FIGS. 5 and 6, worm gears 43 and 44, a pulley 45, and bearings 46 and 47 are coaxial with a loading shaft 42, and pillow brackets 48 and 49 support loading shaft 42. A pulley 51 is mounted on the rotating shaft of a motor 75B, and a belt 52 is looped around pulleys 51 and 45. Gears 53 and 54 mesh with worm gears 43 and 44, and rollers 55 and 56 are coaxial with these gears 53 and 54. Rollers 55 and 56 is made of a material having a large coefficient of friction such as a rubbery material. Gear 54 and roller 56 are mounted on a lever 57 which is pivotally mounted on subchassis 25. A spring 58 is interposed between lever 57 and subchassis 25. The surface of lever 57 on which roller 56 is mounted is normally biased inward (direction toward the turntable 21) by spring 58.

Referring to FIG. 6, a switch 59 (SW1) is for rotating motor 75B in the forward direction, and a switch 60 (SW2) is for rotating motor 75B in the reverse direction.

The mode of operation of the device as described above will now be described. When jacket 12 is inserted through insertion port 17, the two sides of jacket 12 are guided along rails 26 and are guided inward. Then, forward rotation switch 59 is turned on by the side edge of jacket 12. Motor 75B is rotated in the forward direction, and its rotational force is transmitted to loading shaft 42. Roller 55 rotates counterclockwise and roller 56 rotates clockwise to pull the jacket 12 inward. Since rollers 55 and 56 have a large coefficient of friction and roller 56 is biased against the jacket 12 by spring 58, jacket 12 may be smoothly pulled inside even if the user's hand is released from jacket 12 halfway through the insertion operation. The position of jacket 12 at which it comes into contact with rollers 55 and 56 will be described as a loading start position.

When jacket 12 reaches the position of chucking device 19, cover 15 of spine 14 is securely held by device 19. Cover 15 has, for example, a notch 151 which receives pawls 191 and 192 of device 19, so that cover 15 may be securely held. At this time, chucking device 19 is urged by jacket 12, and reverse rotation switch 60 is turned on. Then, motor 75B is rotated in the reverse direction. In a description to follow, a specific position of jacket 12 will be referred to as a predetermined inserted position when cover 15 is held by chucking device 19 and jacket 12 may be unloaded therefrom. When motor 75B is rotated in the reverse direction, roller 55 rotates clockwise, and roller 56 rotates counterclockwise. Then, jacket 12 is fed in the direction to be unloaded. When the end of jacket 12 passes by rollers 55 and 56, the feeding operation of jacket 12 is terminated. This state is defined as a state wherein the feeding operation of jacket 12 by the automatic loading device is released. Upon achieving this state, jacket 12 may be pulled away by hand. When reproduction of disc 11 is terminated and disc 11 is to be unloaded, jacket 12 is automatically fed inward and is then pulled away.

Figure 7:
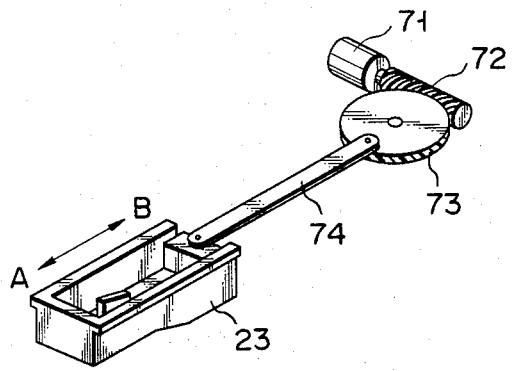
FIG. 7 is a perspective view showing an example of a turntable lift device portion.
Figure 8:
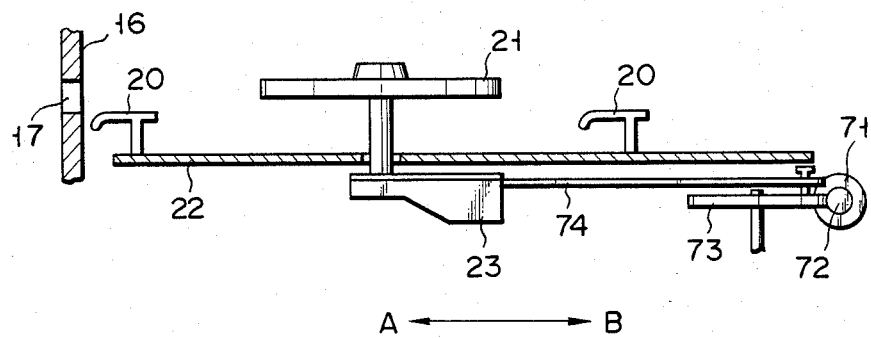
FIG. 8 is a side view showing the overall device of FIG. 7.

FIG. 7 is a perspective view showing a lift device for lifting the turntable 21. Referring to FIG. 7, reference numeral 71 denotes a motor; 72, a worm gear; 73, a cam; and 74, a lever for coupling cam 73 with slider 23. FIG. 8 is a side view showing the overall configuration of a lift device for lifting the turntable 21.

With the device of the configuration as described above, the rotational force of motor 71 is transmitted to cam 73 through worm gear 72. Rotation of cam 73 is then converted to linear movement by lever 74 and the linear movement is transmitted to slider 23. Then, slider 23 slides in the direction indicated by the arrows A and B as described with reference to FIGS. 2 and 3. In this case, slider 23 slides in the direction indicated by arrow A upon the first half revolution of cam 73 and slides in the direction indicated by arrow B upon the remaining half revolution of cam 73.

Figure 9:
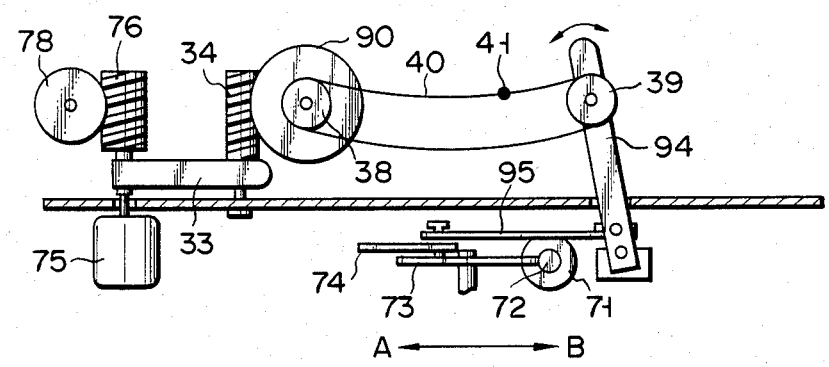
FIGS. 9, 10 and 10A are a side view and perspective views, respectively, showing an example of a single motor arrangement for both the arm feed device and the automatic loading device.
Figure 10:
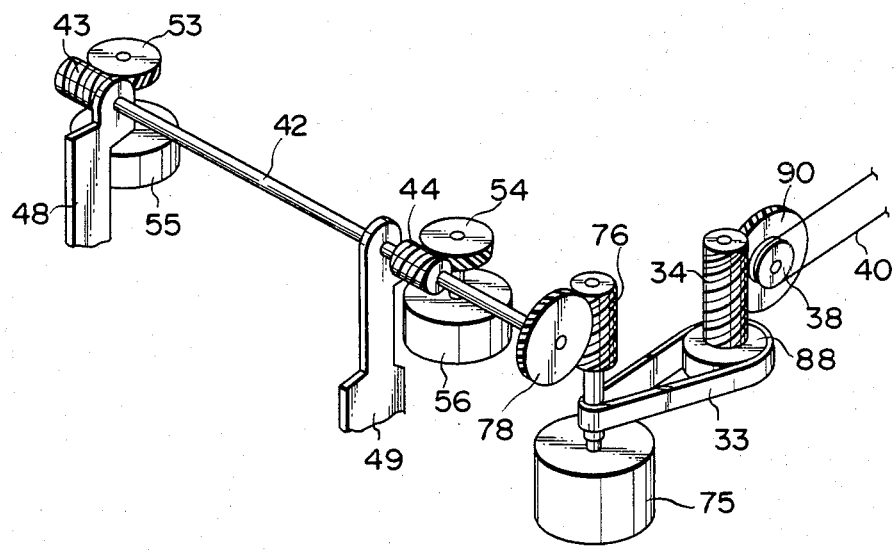

FIG. 9 shows a partial side view of a single motor arrangement for an arm feed device (pickup shift mechanism) and an automatic loading device. FIG. 10 is a perspective view of FIG. 9. The rotor shaft of motor 75 is coupled via a belt 33 to a pulley 88. Pulley 88 is coaxially provided with a worm gear 34. Worm gear 34 is meshed with a gear 90. Gear 90 is coaxially provided with a pulley 38. Pulley 38 is connected to another pulley 39 via a looped wire 40. The pin 41 of FIG. 4 is fixed to a given portion of wire 40. Pulley 39 is supported on a pivotal lever 94. Lever 94 is coupled via a link 95 to the lever 74 of FIG. 8. The rotor shaft of motor 75 is provided with a worm gear 76. Worm gear 76 is meshed with a gear 78 which is coaxially fixed to the loading shaft 42 of FIG. 5. Shaft 42 is supported by pillow brackets 48 and 49. Two portions of shaft 42 which are located at the outsides of brackets 48 and 49 are provided with worm gears 43 and 44. Worm gear 43 is meshed with a gear 53 which is coaxially coupled to the roller 55 of FIG. 5. Worm gear 44 is meshed with a gear 54 which is coaxially coupled to the roller 56 of FIG. 5.

The operation of the arrangement as described above will now be described. The rotation of motor 75 is transmitted to gear 78 through worm gear 76, and loading shaft 42 rotates. Then, gears 53 and 54 are rotated through worm gears 43 and 44, respectively, and rollers 55 and 56 rotate in opposite directions (clockwise and counterclockwise). The direction of rotation of rollers 55 and 56 is controlled by that of motor 75. The rotation of rollers 55 and 56 is transmitted to jacket 12 (not shown in FIG. 10) which is fed in either the loading or unloading direction.

The rotation of motor 75 is transmitted to pulley 88 through belt 33, and worm gear 34 is rotated. The rotation of worm gear 34 is transmitted to pulley 38 through gear 90.

Assume that turntable 21 is being lowered, and one end of lever 95 moves in the direction indicated by arrow A. Then, lever 94 pivots counterclockwise, and wire 40 is loosened (FIG. 9). Thus, the rotation of pulley 38 is not transmitted to wire 40.

On the other hand, when turntable 21 is being lifted, lever 95 moves in the direction indicated by arrow B, and lever 94 pivots clockwise. Then, wire 40 is tightened, and the rotation of pulley 38 is transmitted to wire 40. The carriage 28 of FIG. 4 is fed, and pickup arm 27 is fed in the radial direction of video disc 11.

Figure 10A:
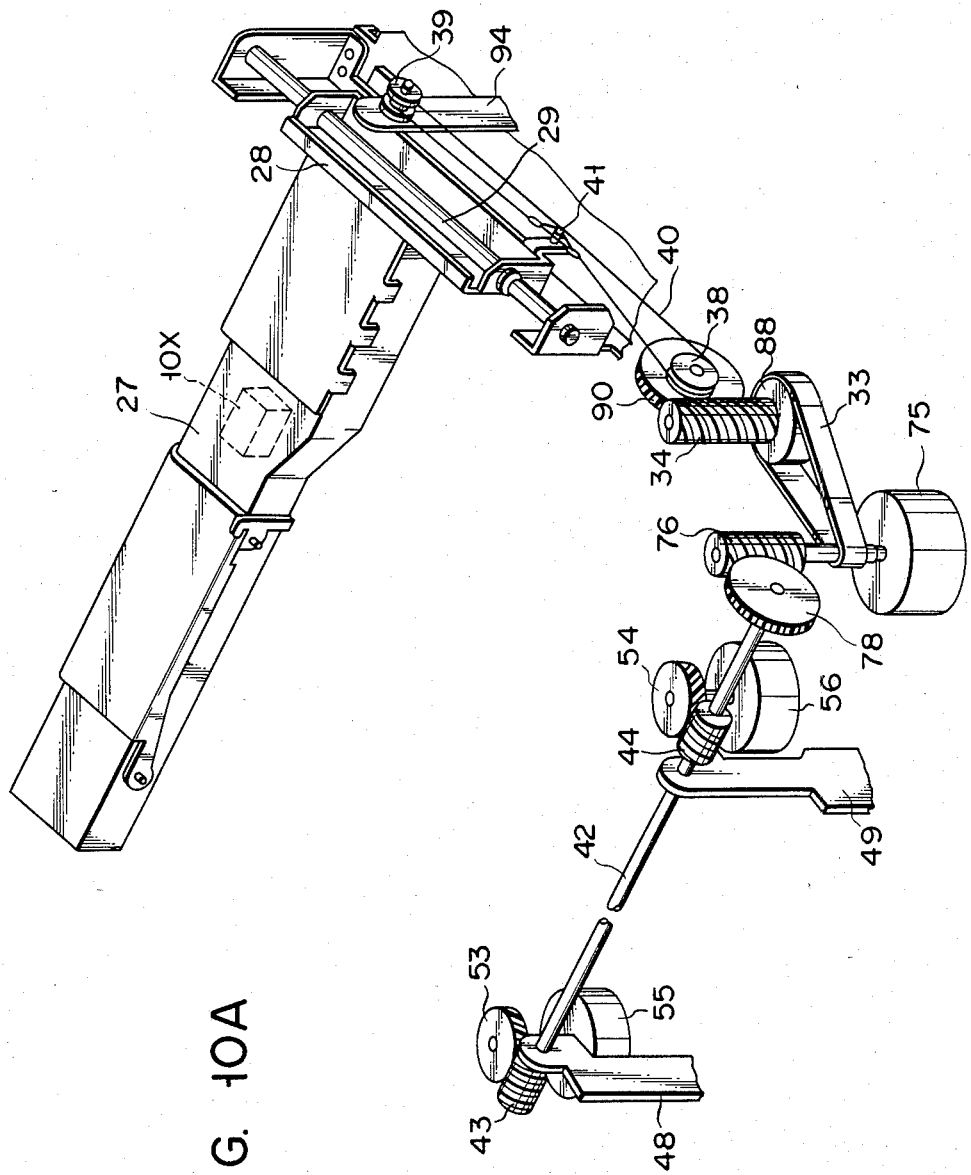

With the arrangement as shown in FIGS. 9 and 10, a single motor may be used for driving both the arm feed device and the automatic loading device. Thus, the motor 75 has the function of motor 75A (FIG. 4) as well as the function of motor 75B (FIG. 5). A complete mechanical configuration of the invention using such a single motor 75 is obtained when the arrangement of FIGS. 9 and 10 is substituted for the arrangement of motors 75A (FIG. 4) and 75B (FIG. 5), as schematically shown in FIG. 10A.

Figure 11:
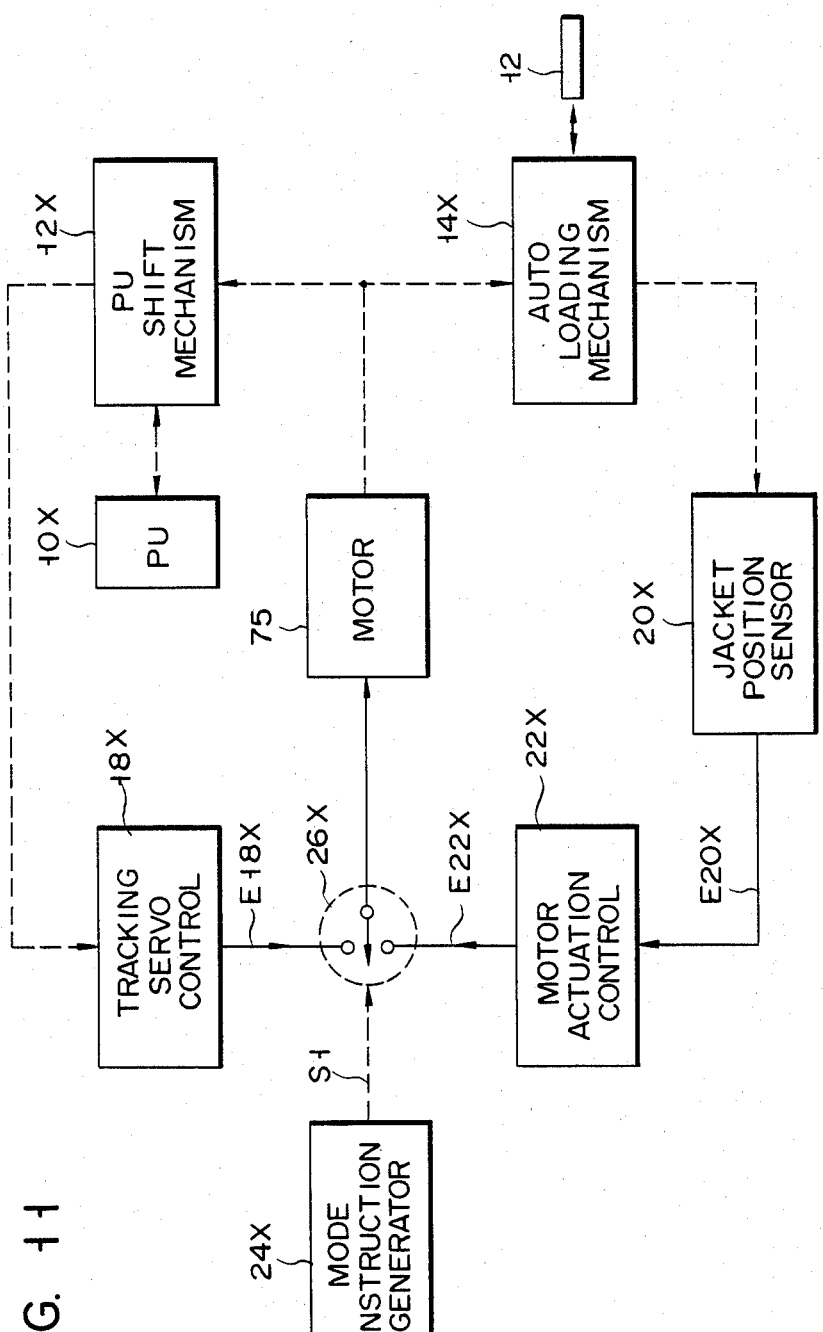
FIG. 11 is a block diagram showing a basic configuration of the invention.

FIG. 11 shows a basic configuration of a motor drive apparatus of the inventiON. A pickup 10X is provided at a given portion of the pickup arm 27 (FIG. 4 or 10A). Pickup 10X shifts parallel along the radial direction of turntable 21 by means of a pickup shift mechanism 12X. Mechanism 12X of FIG. 11 corresponds to the elements 27 to 29 of FIG. 10A. Mechanism 12X is coupled to motor 75 via the elements 41, 40, 38, 90, 34, 88 and 33 of FIG. 10A when lever 94 tightens the belt 40. When belt 40 is loosened, mechanism 12X is released from motor 75. Motor 75 is also coupled to an automatic loading mechanism 14X via the elements 76, 78, 42 to 44 and 53 to 56 of FIG. 10A. Mechanism 14X of FIG. 11 corresponds to the configuration of FIGS. 5 and 6.

Pickup 10X mounted on the mechanism 12X is coupled to a tracking servo control circuit 18X. The configuration of circuit 18X may be a conventional one and is generally described in:

Kenji IKAWA et al. "CED Videodisc Player, VP100"
Toshiba Review No. 134 (July to August 1981) pp. 26 to 30, especially FIG. 4. or
"Video Disc" RCA Review, Vol 39, No. 1 (1978)

All disclosures of the above citations are now combined herewith. Circuit 18X provides a detected control output E18X used for a tracking servo control of the pickup 10X. Output E18X may be obtained from a synchronous detector shown in FIG. 4 of "CED Videodisc Player, VP100". Output E18X is supplied via a switch 26X to the motor 75. The rotational direction and the rotation speed of motor 75 depend on the potential and polarity of output E18X.

The elements 75, 10X +12X and 18X constitute a closed loop for servo-controlling the tracking position of pickup 10X.

Locations of jacket 12 being fed in the loading mechanism 14X are sensed by a jacket position sensor 20X. Sensor 20X senses three specific positions of jacket 12. Sensor 20X corresponds to the switches SW1, SW2 and SW3 shown in FIG. 5, 6, 16 or 18. Sensor 20X provides a motor actuation controller 22X with sensed data E20X. Controller 22X generates a control output E22X. Details of controller 22X will be described later referring to FIGS. 16 and 18. Output E22X is supplied via switch 26X to motor 75 and to actuate it. The rotational direction of motor 75 depends on the polarity of output E22X. The signal selection of switch 26X is determined by a first instruction S1 obtained from a mode instruction generator 24X. The circuit configuration of generator 24X will be described later referring to FIG. 15.

The elements 75, 14X, 20X and 22X constitute an actuation control loop for governing the loading/unloading actuation of jacketed disc 11. When the actuation control loop is enabled, wire 40 is loosened so that said servo control loop is disenabled.

According to the configuration of FIG. 11, a single motor 75 is sufficient both for an actuation control of automatic loading and for a pickup tracking servo control.

Figure 12:
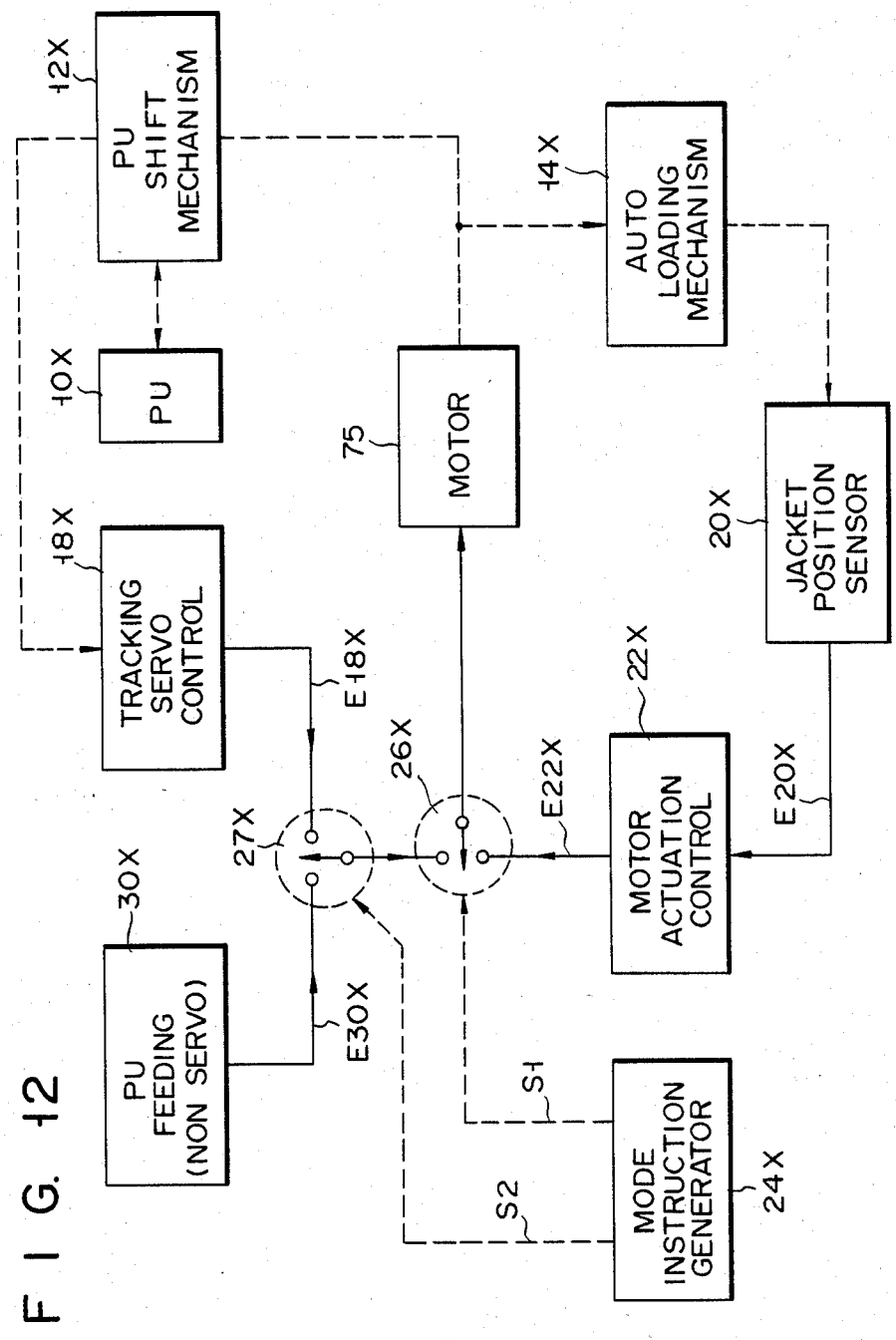
FIG. 12 is a block diagram showing one modification of FIG. 11.

FIG. 12 shows an advanced modification of FIG. 11. The configuration of FIG. 12 differs from that of FIG. 11 regarding the elements 27X and 30X. Thus, motor 75 is coupled via switches 26X and 27X to servo control circuit 18X when switch 27X selects a tracking servo operation. Where switch 27X selects a mode of non-tracking servo operation, motor 75 is coupled to a pickup feeding source 30X via switches 26X and 27X. The selection state of switch 27X is determined according to a second instruction S2 obtained from mode instruction generator 24X. Where pickup feeding source 30X is selected by the instruction S2, motor 75 is rotated by an output E30X of source 30X. The rotational direction of motor 75 depends on the polarity of output E30X. The nonservo operation provides a fast forward shift or a fast reverse shift of pickup 10X.

According to the configuration of FIG. 12, a single motor 75 is used for an automatic loading, a pickup servo-tracking and a pickup nonservo-feeding.

FIG. 13 shows another modification of FIG. 11. The configuration of FIG. 13 differs from that of FIG. 11 regarding the elements 28X and 32X. Thus, motor 75 is coupled via switches 26X and 28AX to a DC polarity change circuit 32AX, or coupled via switches 26X and 28BX to an AC polarity change circuit 32BX. Circuits 32AX and 32BX constitute a polarity change circuit 32X and are coupled to the servo control circuit 18X. Switches 28AX and 28BX constitute a two-pole two-ganged type switch 28X.

The selection state of each of switches 28AX and 28BX is determined according to a third instruction S3 obtained from the mode instruction generator 24X. Where the positive polarity of DC circuit 32AX and the normal phase polarity of AC circuit 32BX are selected by the instruction S3, motor 75 is forwardly rotated according to a positive output DC32+, and is servo-controlled according to a normal phase output AC32+ so that the forward tracking servo control of pickup 10X is performed. Where the negative polarity of DC circuit 32AX and the inverted phase polarity of AC circuit 32BX are selected by the instruction S3, motor 75 is reversely rotated according to a negative output DC32−, and is servo-controlled according to an inverted phase output AC32− so that the reverse tracking servo control of pickup 10X is performed.

According to the configuration of FIG. 13, a single motor 75 is used for automatic loading and for forward-/reverse servo-tracking.

FIG. 14 shows still another modification of FIG. 11. The configuration of FIG. 14 resembles the configuration of FIGS. 12 and 13. Thus, motor 75 is coupled via switches 26X and 28AX to a DC polarity change circuit 32AX according to a first instruction S1. Circuit 32AX is coupled via switch 27X to a pickup feeding source 30X when a second instruction S2 instructs a nonservo pickup feeding. The direction of pickup feeding, or the rotational direction of motor 75, is determined according to a third instruction S3. That is, when instruction S3 instructs a fast forward shift, a positive output DC32+ whose magnitude corresponds to the voltage of output E30X is supplied to the motor 75. In this case a fast forward shift of pickup 10X is carried out. When instruction S3 instructs a fast reverse shift, a negative output DC32− whose magnitude corresponds to the voltage of output E30X is supplied to the motor 75. In this case a fast reverse shift of pickup 10X is carried out.

When instruction S2 instructs a tracking servo operation, circuit 32AX is coupled via switches 27X and 28BX to an AC polarity change circuit 32BX. Thus, when instructions S1 and S2 select the circuits 32AX and 32BX, the tracking servo loop containing the elements 75, 10X+12X, 18X, 32BX and 32AX is established. When instruction S3 instructs a forward tracking servo control, a positive output DC32+ containing a normal phase output AC32+ is supplied to the motor 75 so that the forward tracking servo control of pickup 10X is performed. When instruction S3 instructs a reverse tracking servo control, a negative output DC32− containing an inverted phase output AC32− is supplied to the motor 75 so that the reverse tracking servo control of pickup 10X is carried out.

According to the configuration of FIG. 14, a single motor 75 is used for automatic loading, for forward-/reverse nonservo-feeding and for forward/reverse servo-tracking.

FIG. 15 shows a circuit configuration of the mode instruction generator 24.

One end of each of keys 180 to 188 is applied with a power source potential +Vcc which has a logical level of "1". Keys 180 to 188 correspond to the operation keys 18 of FIG. 1. The other end of each of keys 180 to 186 is connected respectively to a set terminal of each of RS filp-flops (RS FF) 250 to 256. The other end of key 188 is coupled respectively via diodes D12, D22, D32 and D42 to the reset terminal of RS FFs 250 to 256. The Q output of FF 250 is coupled respectively via diodes D24, D34 and D44 to the reset terminals of FFs 252, 254 and 256. The Q output of FF 252 is coupled respectively via diodes D14, D36 and D46 to the reset terminals of FFs 250, 254 and 256. The Q output of FF 254 is coupled respectively via diodes D16, D26 and D48 to the reset terminals of FFs 250, 252 and 256. The Q output of FF 256 is coupled respectively via diodes D18, D28 and D38 to the reset terminals of FFs 250, 252 and 254.

The $\bar{Q}$ output of FF 250 is connected to the cathode of each of diodes D52 and D70. The $\bar{Q}$ output of FF 252 is connected to the cathode of a diode D72. The $\bar{Q}$ output of FF 254 is connected to the cathode of each of diodes D54, D62 and D74. The $\bar{Q}$ output of FF 256 is connected to the cathode of each of diodes D64 and D76. The anodes of diodes D52 and D54 are coupled via a resistor R52 to a circuit line of the power source potential Vcc, and are coupled via a diode D56 to the base of an NPN transistor Q52. The collector of transistor Q52 is coupled via a resistor R54 to the Vcc line and its emitter is circuit-grounded.

The anodes of diodes D62 and D64 are coupled via a resistor R62 to the Vcc line. These anodes are coupled to the base of an NPN transistor Q62 via a diode D68, and also to the collector of an NPN transistor Q72 via a diode D66. The collector of transistor Q62 is coupled via a resistor R64 to the Vcc line and its emitter is circuit-grounded.

The anodes of diodes D70 to D76 are coupled via a resistor R72 to the Vcc line, and are coupled via a diode D78 to the base of transistor 72. The collector of transistor Q72 is coupled via a resistor R74 to the Vcc line and its emitter is circuit-grounded. The collector of transistor Q72 is connected to the base of an NPN transistor Q74. The collector of transistor Q74 is coupled to the Vcc line via a resistor R76 and its emitter is circuit-grounded.

The first, second and third instructions S1, S2 and S3 are obtained from the collectors of transistors Q74, Q62 and Q52, respectively.

Table I shows a truth table of the mode instruction generator 24 of FIG. 15.

TABLE I

| KEY | MODE | S1 | S2 | S3 | OPERATION |
|---|---|---|---|---|---|
| NF | A | 0 | 0 | 1 | Normal Forward |
| NR | B | 0 | 0 | 0 | Normal Reverse |
| FF | C | 0 | 1 | 1 | Fast Forward |
| FR | D | 0 | 1 | 0 | Fast Reverse |
| STP | E | 1 | 1 | 1 | Automatic Loading |
|  |  | 1 | 1 | 0 | & Stop |

Figure 16:
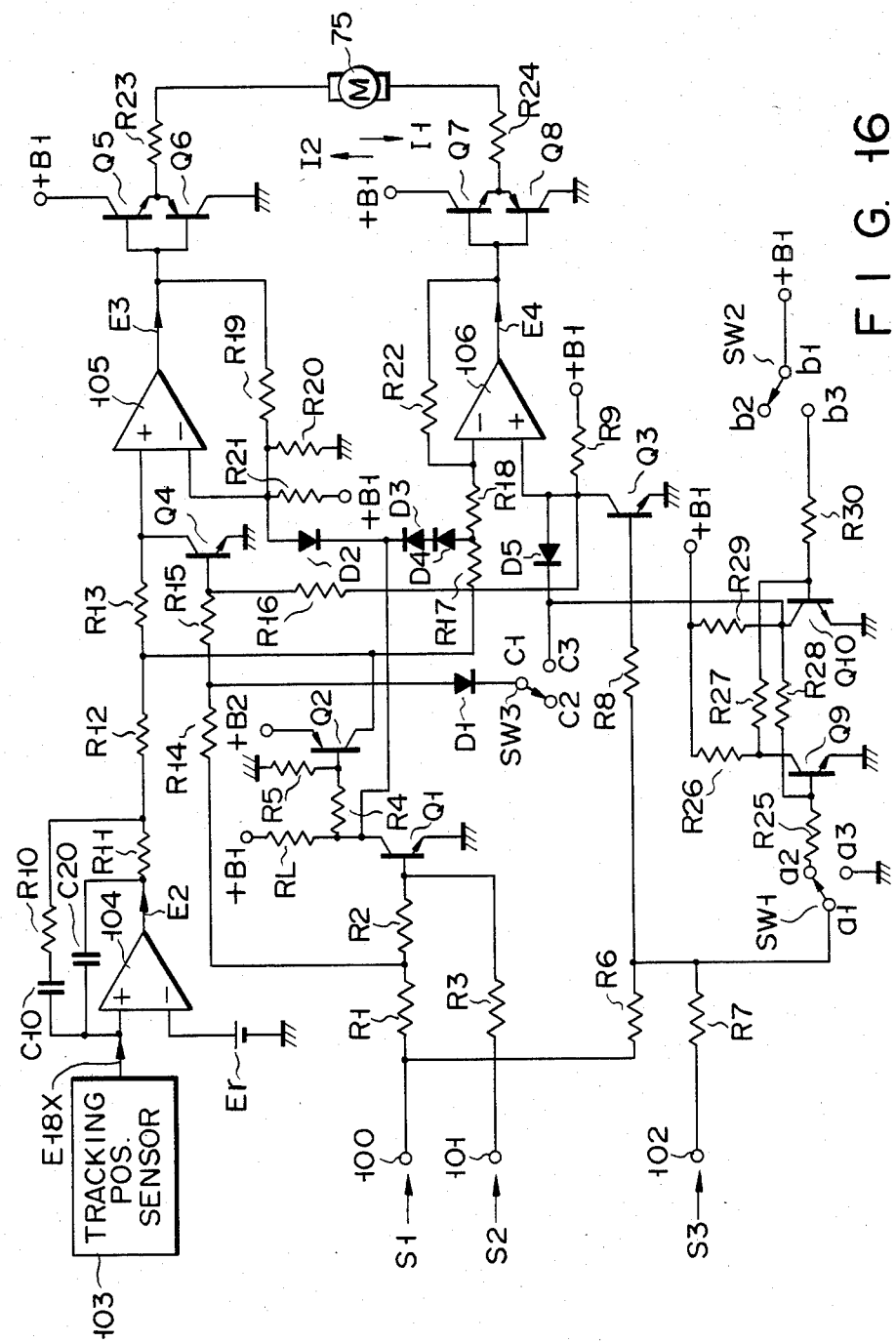
FIG. 16 is a circuit diagram of a motor drive apparatus according to the present invention.

FIG. 16 shows a circuit configuration of the elements 18X to 22X and 26X to 32X of FIGS. 11 to 13. In FIG. 16, terminals 100, 101 and 102 receive the instructions S1, S2 and S3, respectively. Terminal 100 is coupled via a series circuit of resistors R1 and R2 to the base of an NPN transistor Q1. Terminal 101 is coupled via a resistor R3 to the base of transistor Q1. The collector of transistor Q1 is coupled via a resistor RL to a +B1 line whose potential corresponds to a logical "1" level. The emitter of transistor Q1 is circuit-grounded. The collector of transistor Q1 is coupled to the circuit ground via a series circuit of resistors R4 and R5. The junction of resistors R4 and R5 is connected to the base of a PNP transistor Q2. The emitter of transistor Q2 is applied with a potential of +B2.

Terminal 102 is coupled via a series circuit of resistors R7 and R8 to the base of an NPN transistor Q3. The junction of resistors R7 and R8 is coupled via a resistor R6 to the terminal 100. The emitter of transistor Q3 is circuit-grounded and the collector thereof is coupled via a resistor R9 to the +B1 line. The junction of resistors R1 and R2 is coupled via a series circuit of resistors R14 and R15 to the base of an NPN transistor Q4. The base of transistor Q4 is coupled via a resistor R16 to the collector of transistor Q3. The emitter of transistor Q4 is circuit-grounded and the collector thereof is coupled via a resistor R13 to the collector of transistor Q2. The collector of transistor Q2 is coupled via a series circuit of resistors R11 and R12 to the output terminal of an operational amplifier 104. The output terminal of amplifier 104 is coupled via a capacitor C20 to the noninverted input terminal thereof. This noninverted input terminal is coupled via a series circuit of a capacitor C10 and resistor R10 to the junction of resistors R11 and R12.

The inverted input terminal of amplifier 104 is applied with a reference potential Er and the noninverted input terminal thereof receives said detected control output E18X. Output E18X is obtained from a tracking position sensor 103 which constitutes a part of the tracking servo control circuit 18X. Sensor 103 produces the control output E18X as position data for discriminating whether the reproducing stylus of pickup 10X is accurately tracking on the prescribed recording track.

The collector of transistor Q4 is connected to the noninverted input terminal of an operational amplifier 105. The output terminal of amplifier 105 is coupled via a resistor R19 to the noninverted input terminal thereof. This noninverted input terminal is circuit-grounded via a resistor R20, is coupled via a resistor R21 to the +B1 line, and is coupled via a diode D2 to the collector of transistor Q1. The collector of transistor Q3 is connected to the noninverted input terminal of an operational amplifier 106. The output terminal of amplifier 106 is coupled via a resistor R22 to the inverted input terminal thereof. This inverted input terminal is coupled via a series circuit of resistors R17 and R18 to the collector of transistor Q2. The junction of resistors R17 and R18 is coupled via series-stacked diodes D3 and D4 to the collector of transistor Q1.

The collector of transistor Q3 is coupled via a diode D5 to the collector of an NPN transistor Q10. The collector of transistor Q10 is coupled via a resistor R29 to the +B1 line and via a resistor R28 to the base of an NPN transistor Q9. The collector of transistor Q9 is coupled via a resistor R26 to the +B1 line and via a resistor R27 to the base of transistor Q10. The emitters of transistors Q9 and Q10 are circuit-grounded. The base of transistor Q9 is coupled via a resistor R25 to one contact a2 of a switch SW1. The other contact a3 of SW1 is circuit-grounded. The contact piece a1 of SW1 is connected to the junction of resistors R7 and R8. The base of transistor Q10 is coupled via a resistor R30 to one contact b3 of a switch SW2. The other contact b2 of SW2 is free. The contact piece b1 of SW2 is connected to the +B1 line. The collector of transistor Q10 is connected to one contact c3 of a switch SW3. The other contact c2 of SW3 is free. The contact piece c1 of SW3 is coupled via a diode D1 to the junction of resistors R14 and R15.

The output terminal of amplifier 105 is connected to the base of an NPN transistor Q5 and to the base of a PNP transistor Q6. The collector of transistor Q5 is connected to the +B1 line and the collector of transistor Q6 is circuit-grounded. The emitters of transistors Q5 and Q6 are coupled via a resistor R23 to one end of a DC motor 75. The output terminal of amplifier 106 is connected to the base of an NPN transistor Q7 and to the base of a PNP transistor Q8. The collector of transistor Q7 is connected to the +B1 line and the collector of transistor Q8 is circuit-grounded. The emitters of transistors Q7 and Q8 are coupled via a resistor R24 to the other end of motor 75.

Switches SW1, SW2 and SW3 are provided for forward rotation, reverse rotation and stopping of the motor 75, respectively, and their functions are identical with those of switches 59, 60 and 68 in FIGS. 5 and 6.

The forward or reverse rotation of motor 75 is switched in accordance with the potential states of the outputs from amplifiers 105 and 106. Amplifier 104 generates an error signal E2 which indicates the degree of deviation of the reproducing stylus from the normal or prescribed tracking position of video disc 11. In the automatic loading operation or in the fast feeding operation of pickup arm 27, sensor 103 generates no control output E18X, and amplifier 104 does not provide the error signal E2. On the other hand, when the reproducing stylus of pickup 10X should trace a prescribed track of disc 11 accurately, sensor 103 generates the control output E18X representing the actual tracking position of the stylus, and amplifier 104 provides the error signal E2. Then, the rotational speed of motor 75 is controlled according to the potential of output E18X, and the feeding speed of pickup arm 27 is servocontrolled so that the reproducing stylus of pickup 10X is positioned in the prescribed track. Such a tracking control must be performed when video disc 11 is reproduced or played back in the forward direction (normal forward) or in the reverse direction (normal reverse) with a given speed being identical to the recording speed of disc 11. In this case, error signal E2 from amplifier 104 is applied to motor 75 through amplifier 105 or 106, and the rotational speed of motor 75 is servo-controlled.

In the feeding operation of pickup arm 27, the rotation of motor 75 is governed by the first, second and third instruction signals S1, S2 and S3. Switches SW1 to SW3 are normally kept in predetermined states. On the other hand, during the automatic loading operation, the rotation of motor 75 is controlled in accordance with the connection states of switches SW1 to SW3. The logical levels of each of signals S1 to S3 during the feeding operation as well as the automatic loading operation may be summarized as in the aforementioned table I.

Referring to table I, operation modes A to D are related to the feeding operation of pickup arm 27. Of these modes, the tracking servo control of pickup 10X of the pickup arm 27 is performed in modes A and B and is not performed in modes C and D. An example of a mode for not performing the tracking servo control is a mode wherein the reproducing stylus of pickup 10X is fed at high speed to a predetermined track position on the video disc 11.

The reproducing stylus of pickup 10X is fed in the forward direction in modes A and C, and is fed in the reverse direction in modes B and D. A mode E is used for automatic loading and for stopping the player. "1" in table I indicates that the corresponding instruction signal S1, S2 or S3 has a high level, and "0" indicates that the corresponding instruction signal S1, S2 or S3 has a low level.

The mode of operation of the circuit shown in FIG. 16 will now be described with reference to table I. A description will be made of the operation modes A to E.

In the operation modes A and B, a control output E18X representing the actual tracking position of pickup 10X is produced from tracking position sensor 103. Output E18X and a reference potential Er are supplied to amplifier 104 which produces a positive error signal E2.

(1) Operation Mode A

In this case, signals S1 to S3 are at levels "0", "0" and "1", respectively. Then, transistors Q1, Q2 and Q4 are off, and transistor Q3 is on. Amplifier 105 operates as a noninverting amplifier, while amplifier 106 operates as an inverting amplifier. Since transistor Q4 is off, error signal E2 from ampilfier 104 is applied to the noninverted input terminal of amplifier 105. Since transistor Q1 is off and diode D2 is reversely biased so that it becomes nonconductive, a positive voltage from the +B1 line is applied to the inverted input terminal of amplifier 105 via resistor R21. Then, amplifier 105 produces a positive voltage or a motor drive voltage E3 whose potential corresponds to the potential of error signal E2. Then, transistor Q5 is turned on, and transistor Q6 is turned off.

Error signal E2 from amplifier 104 is also applied to the inverted input terminal of amplifier 106 via resistors R11, R12, R17 and R18. However, since transistor Q3 is on, the noninverted input terminal of amplifier 106 is at level "0". Therefore, an output signal E4 from amplifier 106 is at level "0". Then, transistor Q7 is turned off, and transistor Q8 is turned on.

When transistors Q5 and Q8 are turned on, a motor drive current I1 flows from Q5 to Q8 through the motor 75. The arm feed device of FIG. 10A is so constructed that when drive current I1 flows into motor 75 in this direction, pickup arm 27 is fed in the forward direction.

Since the amount of drive current I1 changes in accordance with the potential of drive voltage E3, it is controlled according to error signal E2. Therefore, the rotational speed of motor 75 is controlled in accordance with the error signal E2, and the feeding speed of pickup arm 27 is so controlled that the reproducing stylus of pickup 10X is constantly positioned at the normal or prescribed tracking position.

(2) Operation Mode B

As in the operation mode A, transistors Q1 and Q2 are off. Since instruction signal S3 is at level "0", transistor Q3 is off. Then, a positive voltage from the +B1 line is applied to the base of transistor Q4 via resistors R9 and R10, and transistor Q4 is turned on. The noninverted input terminal of amplifier 105 falls to level "0", and the output signal from amplifier 105 also falls to level "0". Thus, transistor Q5 is turned off, and transistor Q6 is turned on.

When transistor Q3 is turned off, a positive voltage from the +B1 line is applied to the noninverted input terminal of amplifier 106 via resistor R9. A motor drive voltage E4 corresponding to error signal E2 appears at the output terminal of amplifier 106. In this case, since amplifier 106 operates as an inverting amplifier, motor drive voltage E4 is positive. Then, transistor Q7 is turned on and transistor Q8 is turned off.

When transistors Q6 and Q7 are turned on, a motor drive current I2 flows from Q7 to Q6 through the motor 75. The arm feed device of FIG. 10A is constructed such that pickup arm 27 is fed in the reverse direction when motor drive current I2 flows in this direction. Since the level of motor drive current I2 is controlled by the level of error signal E2, the reproducing stylus of pickup 10X is constantly positioned on the normal tracking position.

The operation modes C and D will now be described. In the operation modes C and D, the tracking position of the reproducing stylus need not be controlled. Therefore, tracking position sensor 103 does not produce a control output E18X, and the output level of amplifier 104 becomes logical "0".

(3) Operation Mode C

In the operation mode C, signals S1 to S3 are at levels "0", "1" and "1", respectively. Thus, transistors Q1, Q2 and Q3 are turned on, and transistor Q4 is turned off. A voltage substantially equal to a positive voltage of a +B2 line appears at the noninverted input terminal of amplifier 105 via transistor Q2 and resistor R13. When transistor Q1 is turned on, diode D2 is conducted. Therefore, the inverted input terminal of amplifier 105 is set at level "0". Then, a substantially constant motor drive voltage E3 which is substantially equal to the logical "1" level of the +B1 line appears at the output terminal of amplifier 105. Then, transistor Q5 is turned on, and transistor Q6 is turned off.

Since transistor Q3 is on, the noninverted input terminal of amplifier 106 is at level "0", and the output signal E4 therefrom is at level "0". Then, transistor Q8 is turned on, and transistor Q7 is turned off. A motor drive current I1 flows to the motor 75. Since motor drive current I1 is constant, pickup arm 27 is fed at the normal speed in the forward direction.

(4) Operation Mode D

As in the operation mode C, transistors Q1 and Q2 are on. Since signal S3 is at level "0", transistor Q3 is turned off. Then, transistor Q4 is turned on, and the output signal from amplifier 105 is at level "0". Then, transistor Q5 is turned off and transistor Q6 is turned on.

Since transistor Q3 is turned off, a positive voltage of the +B1 line is applied to the noninverted input terminal of amplifier 106 via resistor R9. Since transistor Q1 is turned on, diodes D3 and D4 are conducted. The inverted input terminal of amplifier 106 is at level "0". A substantially constant drive voltage which is substantially equal to the voltage of the +B1 line appears at the output terminal of amplifier 106. Then, transistor Q7 is turned on, and transistor Q3 is turned off.

When transistors Q6 and Q7 are turned on, a constant motor drive current I2 flows, and pickup arm 27 is fed at the normal speed in the reverse direction.

The operation mode E will now be described. In the operation mode E, error signal E2 is not produced.

(5) Operation Mode E

When jacket 12 (FIG. 1) is not inserted in player body 16, contact pieces a1, b1 and c1 of switches SW1, SW2 and SW3 are connected to contacts a2, b2 and c2, respectively. When a power source switch (not shown) is turned on, first and second signals S1 and S2 rise to level "1". This mode (initialize) may be established irrespective of the level "1" or "0" of signal S3.

When the power source switch is first turned on, first and second signals S1 and S2 rise to level "1", and transistors Q1, Q2, Q3 and Q4 are turned on. The output signals from amplifiers 105 and 106 are at level "0". Thus, motor 75 is stopped. Since contact piece a1 of SW1 is connected to contact a2, signal S1 is applied to the base of transistor Q9 via resistors R6 and R25, and transistor Q9 is turned on. Since contact piece b1 of SW2 is connected to contact b2, transistor Q10 is turned off.

When jacket 12 is inserted into player body 16 in the above-mentioned state, contact piece a1 of SW1 is first switched from contact a2 to contact a3 (FIG. 17a; t10). In FIG. 17a, the level "1" corresponds to the state wherein contact piece a1 is connected to contact a2, while the level "0" corresponds to the state wherein contact piece a1 is connected to contact a3. Transistor Q3 is turned off by the switching operation of SW1. Since a positive voltage from the +B1 line is applied to the base of transistor Q9 via resistor R9, diode D5 and resistor R28, the transistor Q9 is kept on.

When transistor Q3 is turned off, a positive voltage from the +B1 line is applied to the noninverted input terminal of amplifier 106 via resistor R9. Since transistor Q1 is on and diodes D3 and D4 are on, the inverted input terminal of amplifier 106 is kept at level "0". Then, a positive voltage which is substantially equal to the voltage of the +B1 line appears at the output terminal of amplifier 106. Then, transistor Q7 is turned on, and transistor Q8 is turned off. Since transistor Q4 is off, the output signal E3 from amplifier 105 is at level "0". Thus, transistor Q6 is turned on, and transistor Q5 is turned off, so that a motor drive current I2 flows into motor 75 (FIG. 17b; t12 to t14). The automatic loading device (FIG. 10A) is constructed such that when motor drive current I2 flows into motor 75, jacket 12 (FIG. 1) is inserted or loaded. The rotating state of motor 75 is shown in FIG. 17b. In FIG. 17b, the positive high level "I2" corresponds to the state wherein jacket 12 is loaded, and the negative high level "I1" corresponds to the state wherein jacket 12 is unloaded, as will be described later.

When jacket 12 begins to be fed, switch SW3 is immediately switched from contact c2 to contact c3. This switching state of SW3 is shown as a level change from level "1" to level "0" in FIG. 17d(t12).

When jacket 12 reaches the position of chucking device 19 (FIG. 6), contact piece b1 of SW2 is connected to contact b3 (FIG. 17c; t14). Then, transistor Q10 is triggered to turn on, and transistor Q9 is turned off. When transistor Q10 is turned on, the noninverted input terminal of amplifier 106 is kept at level "0", and the output signal E4 from amplifier 106 is also set at level "0". Since transistor Q10 is turned on, a forward bias voltage is applied to diode D1 so as to turn it on. Then, transistor Q4 is turned off, and a positive voltage from the +B2 line is applied to the noninverted input terminal of amplifier 105 via transistor Q2 and resistor R13. At this time, since transistor Q1 is on, the inverted input terminal of amplifier 105 is set at level "0". A motor drive voltage E3 which is substantially equal to the voltage of the +B1 line appears at the output terminal of amplifier 105. Then, transistor Q5 is turned on, and transistor Q6 is turned off. A motor drive current I1 flows to the motor 75 (FIG. 17b; t14 to t18). The automatic loading device is constructed such that when motor drive current I1 flows into motor 75, jacket 12 is fed in the unloading (pull out) direction. The level "1" in FIG. 17c corresponds to the state wherein switch SW2 is connected to the side of contact b3. When the feeding operation of jacket 12 in the unloading direction is initiated, switch SW2 is immediately switched from contact b3 to contact b2 (FIG. 17c; t16). Even in this state, according to the bistable operation of flip-flop transistors Q9 and Q10, transistor Q10 is kept on. Therefore, transistor Q9 is kept off, and motor drive current I1 keeps flowing. When jacket 12 is disengaged from rollers 54 and 55 (FIG. 6), switch SW3 is switched to the side of contact c2 (FIG. 17d; t18). Then, the bypass circuit through diode D1 is cut off, and transistor Q4 is turned on. Output signal E3 from amplifier 105 falls to level "0", and motor 75 stops. When this state is achieved, jacket 12 may be removed by hand. Then, switch SW1 is switched from contact a3 to contact a2 (FIG. 17a; t20). Transistor Q9 is then turned on, transistor Q10 is turned off, and the other circuit components return to the states before insertion of jacket 12.

Figure 18:
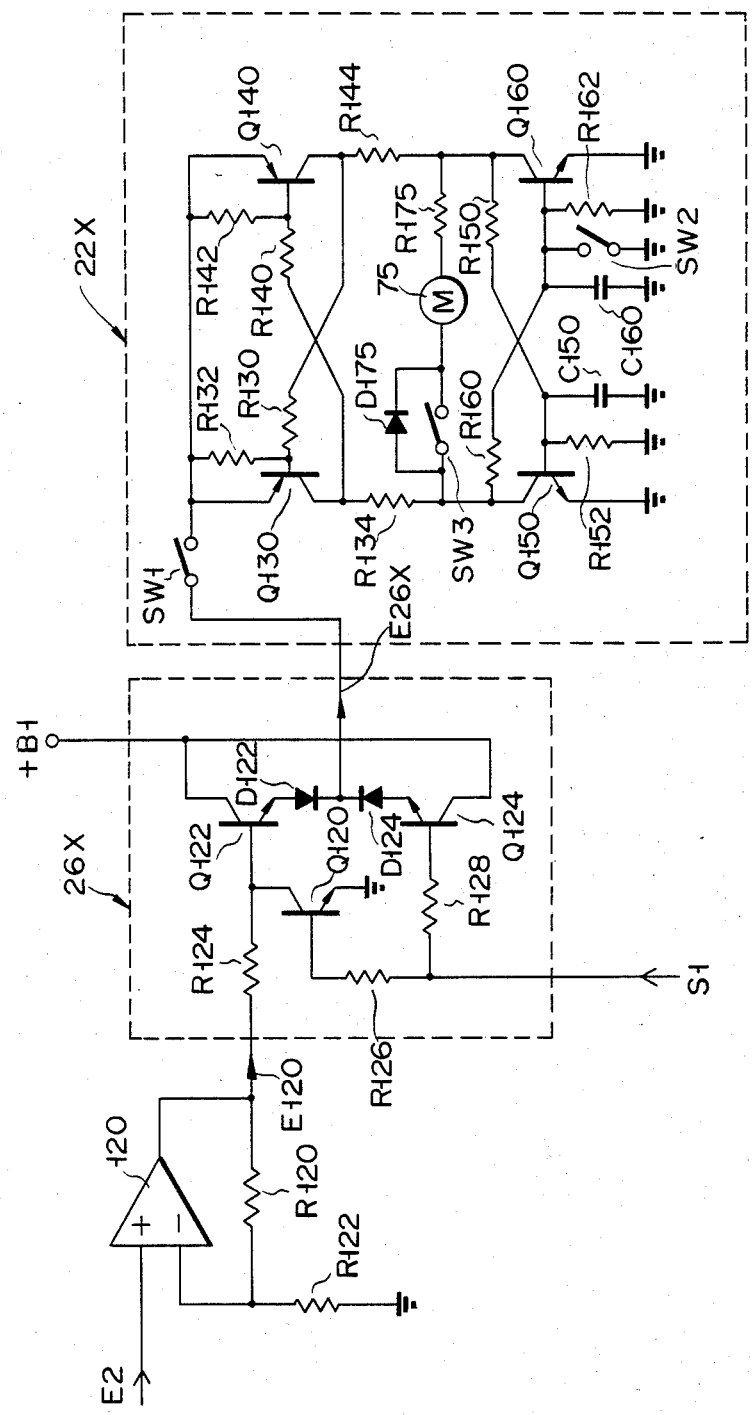
FIG. 18 is a circuit diagram showing a modification of FIG. 16.

FIG. 18 shows a modification of FIG. 16. An error signal E2 from the amplifier 104 of FIG. 16 is applied to the noninverted input terminal of an operational amplifier 120. The output terminal of amplifier 120 is coupled via a resistor R120 to the inverted input terminal thereof. This inverted input terminal is circuit-grounded via a resistor R122. The output terminal of amplifier 120 is coupled via a resistor R124 to the collector of an NPN transistor Q120. The emitter of transistor Q120 is circuit-grounded and the collector thereof is connected to the base of an NPN transistor Q122. The emitter of transistor Q122 is coupled via the anode-cathode path of a diode D122 and the cathode-anode path of a diode D124 to the emitter of an NPN transistor Q124. The collectors of transistors Q122 and Q124 are connected to the +B1 line. A first instruction S1 from the instruction generator 24 of FIG. 15 is applied via a resistor R126 to the base of transistor Q120 and also via a resistor R128 to the base of transistor Q124.

The elements Q120 to Q124, R124 to R128 and D122 to D124 constitute the switch 26X of FIG. 11.

The junction of diodes D122 and D124 is coupled via switch SW1 to the emitters of PNP transistors Q130 and Q140. The base of transistor Q130 is coupled to the collector of transistor Q140 via a resistor R130 and also to its emitter via a resistor R132. The base of transistor Q140 is coupled to the collector of transistor Q130 via a resistor R140 and to its emitter via a resistor R142. The collectors of transistors Q130 and Q140 are coupled respectively via resistors R134 and R144 to the collectors of NPN transistors Q150 and Q160. The emitters of transistors Q150 and Q160 are circuit-grounded. The base of transistor Q150 is coupled via a resistor R150 to the collector of transistor Q160, and is circuit-grounded via a parallel circuit of a resistor R152 and a capacitor C150. The base of transistor Q160 is coupled via a resistor R160 to the collector of transistor Q150, and is circuit-grounded via a parallel circuit of a resistor R162 and a capacitor C160. The base of transistor Q160 is coupled via the switch SW2 to the circuit ground. The collector of transistor Q160 is coupled to one terminal of a DC motor 75 via a resistor R175. The other terminal of motor 75 is coupled to the collector of transistor Q150 via switch SW3. A diode D175 is coupled parallel to switch SW3 so that the cathode of diode D175 turns to motor 75 side. The circuit of FIG. 18 operates as follows. When the logical level of instruction S1 is "0", transistors Q122 is enabled. Thus, transistor Q122 receives at its base a positive servo control signal E120 from the output terminal of amplifier 120, and transistor Q122 supplies at the cathode of diode D122 a drive signal E26X for energizing a transistor bridge circuit (motor actuation control circuit) 22X of motor 75. In this case, transistor Q122 functions as an emitter follower, and the potential of signal E26X corresponds to that of the error signal E2. When switches SW1 and SW3 are ON and transistors Q130 and Q160 are also turned on, forward servo control of motor 75 is performed (mode A of Table I). Where switch SW2 is temporarily turned on and transistors Q140 and Q150 are turned on, a reverse servo control of motor 75 is performed (mode B of Table I).

Figure 17:
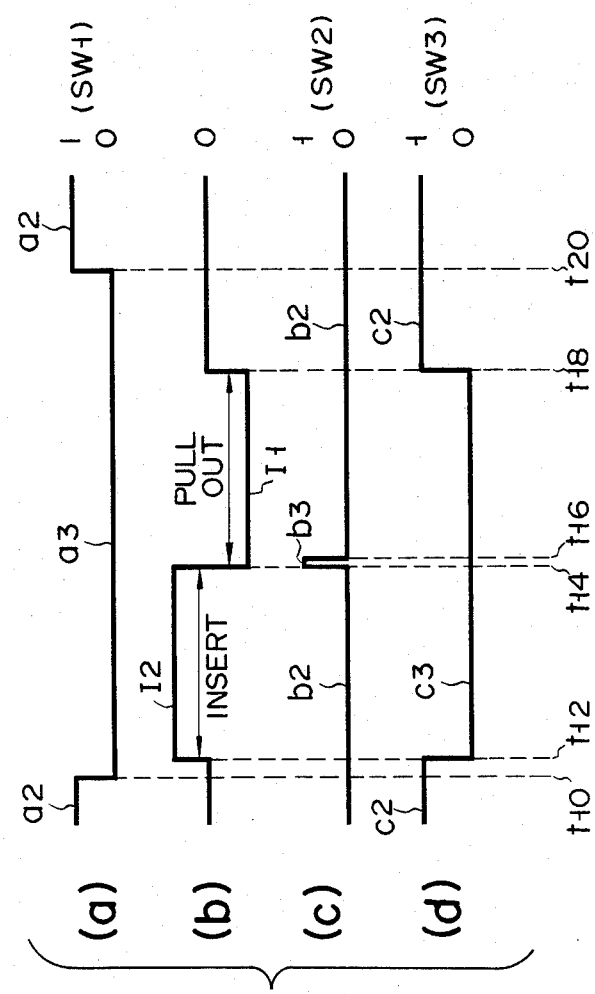
FIGS. 17(*a*) to 17(*d*) are timing charts for explaining the mode of operation of the apparatus shown in FIG. 16.

When the logical level of instruction S1 becomes "1", transistors Q120 and Q124 are turned on, and transistor Q122 is disenabled. In this case the potential of drive signal E26X corresponds to the fixed potential of the +B1 line, and transistor bridge circuit 22X is energized by the fixed potential of signal E26X. Then the operation of circuit 22X is governed by the ON/OFF actuations of switches SW1 to SW3 as shown in FIG. 17, and a forward or reverse fast feeding of pickup 10X (mode C or D of Table I) is carried out.

The embodiment of the present invention as described above provides a motor drive apparatus which has only a single motor 75 for driving both the arm feed device and the automatic loading device. The circuit configuration of this embodiment requires only an addition of a few more components to the conventional circuit. Thus, the present invention significantly reduces the size of the player main body and reduces the manufacturing cost of the apparatus.

The present invention is not limited to the embodiment described above, and various changes and modifications may be made within the scope of the present invention. Furthermore, the present invention may be similarly applied to an apparatus wherein the tracking position of the reproducing stylus is controlled by information other than the rotational speed of the motor 75. Furthermore, the present invention is also applicable to an apparatus which does not have the switch SW3.

In summary, the present invention provides a motor drive apparatus which has a single motor for driving an arm feed device and an automatic loading device.

The present invention may be applied to any configuration other than as disclosed in this application. For instance, configurations disclosed in the following documents are also applicable:

(1) U.S. patent application Ser. No. 304,886 filed on Sept. 23, 1981 Titled "AUTOMATIC LOADING APPARATUS" inventor: FUKUMITSU (2) U.S. patent application Ser. No. 341,626 filed on Jan. 22, 1982 Titled "MOTOR DRIVE APPARATUS" inventor: TANAKA (3) U.S. patent application Ser. No. 401,712 filed on July 26, 1982 Titled "A DISC REPRODUCING APPARATUS" inventor: FUKUMITSU (4) U.S. patent application Ser. No. 423,724 filed on Sept. 27, 1982 Titled "A DISC REPRODUCING APPARATUS" inventor: FUKUMITSU All disclosures of the above documents are now combined herewith.

What we claim is:

1. A motor drive apparatus for a disc player which includes a pickup, a pickup shift mechanism for shifting a position of said pickup and an automatic loading mechanism for loading a jacketed disc into said disc player said motor drive apparatus comprising:
   a single motor for providing power, at different times, to said pickup shift mechanism and automatic loading mechanism;
   servo control means for servo-controlling the rotation of said motor as a function of the position of said pickup;
   position sensor means, coupled to said automatic loading mechanism, for sensing the position of a jacket of said jacketed disc;
   actuation control means, coupled to said position sensor means, for controlling the rotation of said motor according to the position of said jacket so that automatic loading of said jacketed disc is performed; and
   mode instruction means for selectively connecting either said servo control means or actuation control means to said motor, said pickup shift mechanism, servo control means and motor constituting a tracking servo control loop which operates when said mode instruction means connects said servo control means to said motor, and said automatic loading mechanism, position sensor means, actuation control means and motor constituting an actuation control loop which enables the automatic loading of the jacketed disc when said mode instruction means connects said actuation control means to said motor.

2. The apparatus of claim 1 further comprising:
   pickup feeding means coupled to said motor for non-servo-controlling the rotation of said motor so that the position of said pickup is changed,
   wherein said mode instruction means includes servo selection means coupled to said pickup feeding means and to said servo control means for selecting either one of said servo control means and pickup feeding means, only a nonservo feeding of said pickup being effected when said pickup feeding means is selected by said servo selection means.

3. The apparatus of claim 1 further comprising:
   polarity change means coupled to said servo control means and to said motor for changing the polarity of a control signal of said tracking servo control, one polarity of which is used for a clockwise rotation control of said motor and the other polarity of which is used for a counterclockwise rotation control of said motor, wherein said mode instruction means includes polarity selection means coupled to said polarity change means for selecting either one of polarities for the clockwise rotation control and for the counterclockwise rotation control.

4. The apparatus of claim 3, wherein said polarity change means includes:

DC polarity change means coupled to said servo control means and to said motor for changing a DC polarity of electric power applied to said motor; and AC polarity change means coupled to said servo control means and to said motor for changing an AC phase polarity of electric power used for said tracking servo control, and wherein said polarity selection means selects one polarity of the DC electric power and one phase polarity of the AC electric power when said clockwise rotation control is performed, and selects the other polarity of the DC electric power and the other phase polarity of the AC electric power when said counterclockwise rotation control is performed.

5. The apparatus of claim 1 further comprising:

AC polarity change means coupled to said servo control means for changing an AC phase polarity of electric power used for said tracking servo control;

DC polarity change means coupled to said AC polarity change means and to said motor for changing a DC polarity of electric power applied to said motor; and pickup feeding means coupled to said DC polarity change means for nonservo-controlling the rotation of said motor so that the position of said pickup is changed, wherein said mode instruction means includes:

first means for selecting either one of said AC polarity change means and pickup feeding means, only a nonservo feeding of said pickup being effected when said pickup feeding means is selected by said first means; and second means coupled to said AC and DC polarity change means for selecting either one of clockwise and counterclockwise rotations of said motor.

* * * * *